United States Patent
Revier et al.

(10) Patent No.: US 10,908,414 B2
(45) Date of Patent: Feb. 2, 2021

(54) LENS CLEANING VIA ELECTROWETTING

(71) Applicant: TEXAS INSTRUMENTS INCORPORATED, Dallas, TX (US)

(72) Inventors: Daniel Lee Revier, Addison, TX (US); Benjamin Stassen Cook, Addison, TX (US); David Patrick Magee, Allen, TX (US); Stephen John Fedigan, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 251 days.

(21) Appl. No.: 15/591,311

(22) Filed: May 10, 2017

(65) Prior Publication Data
US 2018/0326462 A1 Nov. 15, 2018

(51) Int. Cl.
| | |
|---|---|
| G02B 27/00 | (2006.01) |
| G01H 13/00 | (2006.01) |
| B08B 7/02 | (2006.01) |
| G01D 5/24 | (2006.01) |

(52) U.S. Cl.
CPC .......... *G02B 27/0006* (2013.01); *B08B 7/028* (2013.01); *G01H 13/00* (2013.01); *G01D 5/2405* (2013.01)

(58) Field of Classification Search
CPC .......... B08B 7/02; B08B 7/026; B08B 7/028; G02B 27/0006
See application file for complete search history.

(56) References Cited

U.S. PATENT DOCUMENTS

| | | |
|---|---|---|
| 3,681,626 A | 8/1972 | Puskas |
| 4,019,073 A | 4/1977 | Vishnevsky et al. |
| 4,271,371 A | 6/1981 | Furuichi et al. |
| 4,556,467 A | 12/1985 | Kuhn et al. |

(Continued)

FOREIGN PATENT DOCUMENTS

| | | |
|---|---|---|
| EP | 1703062 | 9/2006 |
| EP | 2479595 A1 | 7/2012 |

(Continued)

OTHER PUBLICATIONS

International Search Report for PCT/US2017/059536 dated Feb. 28, 2018.

(Continued)

*Primary Examiner* — Spencer E Bell
(74) *Attorney, Agent, or Firm* — Ray A. King; Charles A. Brill; Frank D. Cimino

(57) ABSTRACT

An apparatus includes a mass detection circuit coupled to a surface covered with a plurality of electrodes. The mass detection circuit is configured to detect a mass of a first droplet present on the surface. The apparatus further includes a transducer circuit coupled to a transducer, which is coupled to the surface and form a lens unit. The transducer circuit configured to excite a first vibration of the surface at a resonant frequency to form a high displacement region on the surface. The apparatus also includes a voltage excitation circuit coupled to the plurality of electrodes. In response to the detection of the mass of the first droplet, the voltage excitation circuit is configured to apply a sequence of differential voltages on one or more consecutive electrodes which moves the first droplet to the high displacement region.

24 Claims, 2 Drawing Sheets

(56) References Cited

U.S. PATENT DOCUMENTS

| | | |
|---|---|---|
| 4,607,652 A | 8/1986 | Yung |
| 4,691,725 A | 9/1987 | Parisi |
| 4,710,233 A | 12/1987 | Hohmann et al. |
| 4,836,684 A | 6/1989 | Javorik et al. |
| 4,852,592 A | 8/1989 | DeGangi et al. |
| 4,870,982 A | 10/1989 | Liu |
| 5,005,015 A | 4/1991 | Dehn et al. |
| 5,071,776 A | 12/1991 | Matsushita et al. |
| 5,113,116 A | 5/1992 | Wilson |
| 5,178,173 A | 1/1993 | Erickson et al. |
| 5,853,500 A | 12/1998 | Joshi et al. |
| 6,064,259 A | 5/2000 | Takita |
| 6,607,606 B2 | 8/2003 | Bronson |
| 7,705,517 B1 | 4/2010 | Koen et al. |
| 8,286,801 B2 | 10/2012 | Youngs |
| 8,293,026 B1 | 10/2012 | Bodor et al. |
| 8,494,200 B2 | 7/2013 | Ram |
| 8,899,761 B2 | 12/2014 | Tonar et al. |
| 9,070,856 B1 | 6/2015 | Rose et al. |
| 9,080,961 B2 | 7/2015 | Adachi |
| 9,084,053 B2 | 7/2015 | Arkins |
| 9,095,882 B2 | 8/2015 | Shimada et al. |
| 9,226,076 B2 | 12/2015 | Lippert et al. |
| 9,253,297 B2 | 2/2016 | Abe et al. |
| 9,573,165 B2 | 2/2017 | Weber |
| 2006/0285108 A1 | 12/2006 | Morrisroe |
| 2007/0046143 A1 | 3/2007 | Blandino |
| 2007/0159422 A1 | 7/2007 | Blandino |
| 2008/0198458 A1 | 8/2008 | Kashiyama |
| 2008/0248416 A1 | 10/2008 | Norikane |
| 2010/0171872 A1 | 7/2010 | Okano |
| 2011/0073142 A1 | 3/2011 | Hattori et al. |
| 2012/0243093 A1* | 9/2012 | Tonar ............... H01L 41/0973 359/507 |
| 2013/0170685 A1 | 7/2013 | Oh |
| 2013/0242481 A1 | 9/2013 | Kim |
| 2013/0333978 A1 | 12/2013 | Abe |
| 2014/0033454 A1 | 2/2014 | Koops et al. |
| 2014/0218877 A1 | 8/2014 | Wei |
| 2014/0253150 A1 | 9/2014 | Menzel |
| 2015/0277100 A1 | 10/2015 | Novoselov |
| 2016/0266379 A1 | 9/2016 | Li et al. |
| 2017/0361360 A1 | 12/2017 | Li et al. |
| 2018/0085784 A1 | 3/2018 | Fedigan |
| 2018/0085793 A1 | 3/2018 | Fedigan |
| 2018/0117642 A1 | 5/2018 | Magee et al. |
| 2018/0239218 A1* | 8/2018 | Ikeuchi ............... G03B 17/08 |
| 2018/0264526 A1 | 9/2018 | Kim |
| 2018/0275397 A1 | 9/2018 | Chung et al. |
| 2018/0304282 A1 | 10/2018 | Cook |
| 2018/0304318 A1 | 10/2018 | Revier |
| 2018/0326462 A1 | 11/2018 | Revier |
| 2019/0277787 A1* | 9/2019 | Chung ............... B60S 1/02 |

FOREIGN PATENT DOCUMENTS

| | | |
|---|---|---|
| EP | 2777579 B1 | 4/2015 |
| EP | 2873572 A1 | 5/2015 |
| JP | 2009283069 A | 12/2009 |
| JP | 5608688 A | 10/2014 |
| KR | 20130076250 A | 7/2013 |
| WO | 2007005852 A2 | 1/2007 |
| WO | 2010104867 A1 | 9/2010 |

OTHER PUBLICATIONS

Vaseiljev, "Ultrasonic system for solar panel cleaning", Sensors and Actuators A, vol. 200, Oct. 1, 2013, pp. 74-78.

Kazemi, "Substrate cleaning using ultrasonics/megasonics," 2011 IEEE/SEMI Advanced Semiconductor Manufacturing Conference, Saratoga Springs, NY, 2011, pp. 1-6.

Brereton, "Particle Removal by Focused Ultrasound", Journal of Sound and Vibration vol. 173, Issue 5, Jun. 23, 1994, pp. 683-698.

Gale, "Removal of Particulate Contaminants using Ultrasonics and Megasonics: A Review", Particulate Science and Technology, 1994, 13:3-4, 197-211.

Lee, "Smart self-cleaning cover glass for automotive miniature cameras," 2016 IEEE 29th International Conference on Micro Electro Mechanical Systems (MEMS), Shanghai, 2016, pp. 83-86.

Graff, "Wave Motion in Elastic Solids", Dover, 1991 (3 pages).

Hagedorn et al., "Travelling Wave Ultrasonic Motors, Part I: Working Principle and Mathematical Modelling of the Stator", Journal of Sound and Vibration, 1992, 155(1), pp. 31-46.

Ziaei-Moayyed et al., "Electrical Deflection of Polar Liquid Streams: A Misunderstood Demonstration," Journal of Chemical Education, vol. 77, No. 11, Nov. 2000 (4 pages).

Howard, "High speed photography of ultrasonic atomization," Thesis, Brown University, May 13, 2010 (39 pages).

U.S. Appl. No. 15/492,315, entitled "Methods and Apparatus for Ultrasonic Lens Cleaner Using Configurable Filter Banks," filed Apr. 20, 2017 (63 pages).

U.S. Appl. No. 15/492,286, entitled "Methods and Apparatus Using Multistage Ultrasonic Lens Cleaning for Improved Water Removal," filed Apr. 20, 2017 (62 pages).

U.S. Appl. No. 15/492,433, entitled "Methods and Apparatus for Surface Wetting Control," filed Apr. 20, 2017 (46 pages).

U.S. Appl. No. 15/492,395, entitled "Methods and Apparatus for Electrostatic Control of Expelled Material from Lens Cleaners," filed Apr. 20, 2017 (28 pages).

International Search Report for PCT/US2017/064530 dated Apr. 5, 2018.

International Search Report for PCT Application No. PCT/US2018/016714, dated Jun. 21, 2018 (2 pages).

Extended European Search Report for 17866470.2 dated Oct. 8, 2019.

\* cited by examiner

LENS CLEANING VIA ELECTROWETTING

BACKGROUND

New automotive technologies are available that manufacturers can incorporate into automobiles at a reasonable cost in an effort to reduce motor vehicle accidents. Promising technologies include improved obstacle and collision avoidance systems. These systems may include digital camera based surround view and camera monitoring systems. In some cases, cameras can increase safety by being mounted in locations that can give drivers access to perspectives not readily available through the driver's usual view through windows or mirrors. While mounting one or more cameras for alternative views can provide many advantages, some challenges may remain. The challenges include uncleaned lens surfaces of the cameras mounted on the automobiles which make the cameras less useful.

SUMMARY

According to an embodiment, an apparatus includes a mass detection circuit coupled to a surface of a lens covered with a plurality of electrodes. The mass detection circuit is configured to detect a mass of a first droplet present on the surface. The apparatus further includes a transducer circuit coupled to a transducer coupled to the surface. In some embodiments, the transducer and the surface form a lens unit. In some embodiments, the transducer circuit is configured to excite a first vibration of the surface at a resonant frequency to form a high displacement region on the surface. The apparatus also includes voltage excitation circuit coupled to the plurality of electrodes. In response to the detection of the mass of the first droplet, the voltage excitation circuit is configured to apply a sequence of differential voltage on one or more consecutive electrodes to move the first droplet to the high displacement region.

According to another embodiment, an apparatus includes a mass detection circuit coupled to a surface covered with a plurality of electrodes. In some embodiments, the mass detection circuit is configured to detect a mass of a first droplet present on the surface and compare the mass of the first droplet with a first mass threshold value. The apparatus further includes a transducer circuit coupled to the surface. The transducer circuit includes a transducer configured to excite a first vibration of the surface at a resonant frequency to form a high displacement region on the surface. The transducer and the surface form a lens unit. In response to a determination that the mass is greater than the first mass threshold value, the transducer circuit is configured to excite a vibration at a first frequency to the surface to atomize the first droplet to generate a second droplet. The second droplet has a size with a smaller volume than a size of the first droplet. The apparatus further includes a voltage excitation circuit coupled to the plurality of electrodes. In response to the detection of a mass of the second droplet, the voltage excitation circuit is configured to apply a sequence of differential voltage on one or more consecutive electrodes to move the second droplet to the high displacement region. In response to moving the second droplet, the transducer is further configured to excite a second vibration at a second frequency to atomize the second droplet to generate a third droplet. The third droplet has a size with a smaller volume than the size of the second droplet.

In another embodiment, an apparatus includes a transducer circuit coupled to a transducer. The transducer is further coupled to a surface covered with a plurality of electrodes. The transducer and the surface form a lens unit. The transducer circuit is configured to monitor a first frequency of the lens unit. The apparatus further includes a mass detection circuit coupled to the transducer circuit. The mass detection circuit is configured to calculate a mass of a first droplet responsive to the first frequency of the lens unit changing to a second frequency. The apparatus further includes a voltage excitation circuit coupled to the plurality of electrodes and the mass detection circuit. In response to a determination that the mass of the first droplet exceeds a threshold value, the voltage excitation circuit is configured to apply a sequence of differential voltage on one or more consecutive electrodes to move the first droplet from a first location to a second location.

BRIEF DESCRIPTION OF THE DRAWINGS

For a detailed description of various examples, reference will now be made to the accompanying drawings in which.

DETAILED DESCRIPTION

Figure 1:
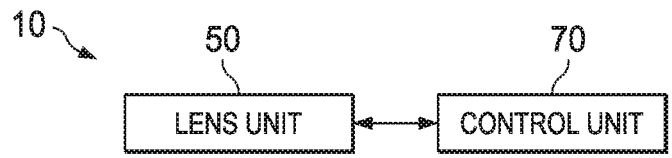
FIG. 1 shows an illustrative block diagram of a system that can expel fluid from a droplet present on a lens unit in accordance with various examples.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

The effectiveness of a camera system is tied to its lens. The lens can be subjected to external entities such as dust and water. For example, focusing a camera, depending on the design of the camera system, require mechanically moving a focusing lens which may let air inside a lens chamber. This operation sometimes results in a dusty lens. In camera systems used in automobiles, along with dust, the lens is also prone to water droplets. For example, a camera system mounted on an automobile can be subjected to an environment which may include rain.

In order to expel droplets or dust particles from a lens, the lens surface can be asserted to a vibration at a resonant frequency. The vibration, in an embodiment, is provided by a transducer mechanically coupled to the lens surface. In some embodiments, the vibration of the lens surface expels dust particles present on the lens surface. In other embodiments, the vibration of the lens surface atomizes and expels fluid from a droplet present on the lens surface. This process of atomization reduces a size of the droplet below an atomization threshold such that when the lens surface is subjected to heat, the remaining fluid in the droplet evaporates.

However, vibrating the lens surface at the resonant frequency creates regions of high acceleration, herein referred as high displacement regions, and low acceleration, herein referred as low displacement regions, on the lens surface. A high displacement region is a location on the lens surface where an entity experiences a high level of axial acceleration. For example, a droplet present at a high displacement region experiences high axial acceleration and expels at least a part of fluid from the droplet. This results in atomization of the droplet, i.e., reduction in the size of the droplet. In contrast, a low displacement region is a location on the lens surface where an entity experiences little or no axial acceleration; therefore, no fluid is expelled from the droplet present at the low displacement region when the surface is vibrated at the resonant frequency.

The embodiments described herein include a lens, covered with a plurality of electrodes, mechanically coupled to a transducer. The disclosed embodiments further include a control unit including a mass detection circuit, a transducer circuit, a voltage excitation circuit, and a memory. In an embodiment, the mass detection circuit detects a mass of a droplet on a surface of a lens and directs the voltage excitation circuit to apply a differential voltage to consecutive electrodes in order to electrostatically move the droplet to a high displacement region. Upon displacing the droplet to a high displacement region, the transducer circuit can generate a resonant frequency to vibrate the lens surface to atomize the droplet from a first droplet size to a second, smaller, droplet size.

FIG. 1 shows an illustrative block diagram of a system 10 that can expel fluid from a droplet present on a lens unit using an ultrasonic transducer mechanically coupled with a lens surface, and can move the droplet to further perform an improved cleaning of the lens surface in accordance with various examples. The system 10 includes a lens unit 50 and a control unit 70. In an embodiment, the control unit 70 is configured to collect data related to the lens unit 50. For example, the control unit 70 collects data related to a location of a high displacement region, a position of a low displacement region, a mass of an entity present on the lens surface and a first location of the entity on the lens surface.

In embodiments, the control unit 70 can be further configured to utilize the collected data and apply a voltage sequence to one or more electrodes of the plurality of electrodes that covers a surface of the lens in the lens unit 50 in order to move the entity from the first location to a second location. For example, the control unit 70 continuously monitors a resonant frequency of the lens unit 50, which contains a transducer which can be mechanically coupled to the lens surface. The presence of an entity on the lens surface changes the resonant frequency of the lens unit 50, thereby indicating a presence of the entity on the lens surface. Additionally, the change in the resonant frequency enables the control unit 70 to make a determination regarding the mass of the entity on the lens surface.

In an embodiment, the control unit 70 can also detect a first location of the entity. For example, the control unit 70 stores an air capacitance value between two consecutive electrodes. The presence of an entity between the consecutive electrodes results in a change in the air capacitance value. This difference assists in detecting the location of the entity on the lens surface. For example, for mesh type electrodes, an air capacitance value can be stored in a memory using Cartesian coordinates for each consecutive pair of electrodes. When a droplet is present on the lens surface, the value of air capacitance between the electrode pair where the droplet is located may change. This change in capacitance value can be utilized to determine the Cartesian coordinates of the first droplet location. Any type of electrode patterning style can be used. Therefore, the corresponding patterning style can include different types of coordinate systems. For example, for spiral shaped patterned electrodes, a cylindrical coordinate system is employed.

In some embodiments, in response to detecting the entity, calculating the mass of the entity, and detecting the first location of the entity, the control unit 70 is further be configured to apply a sequence of voltage excitations to move the entity to a high displacement region to be further atomized and ultimately removed from the lens surface.

Figure 2:
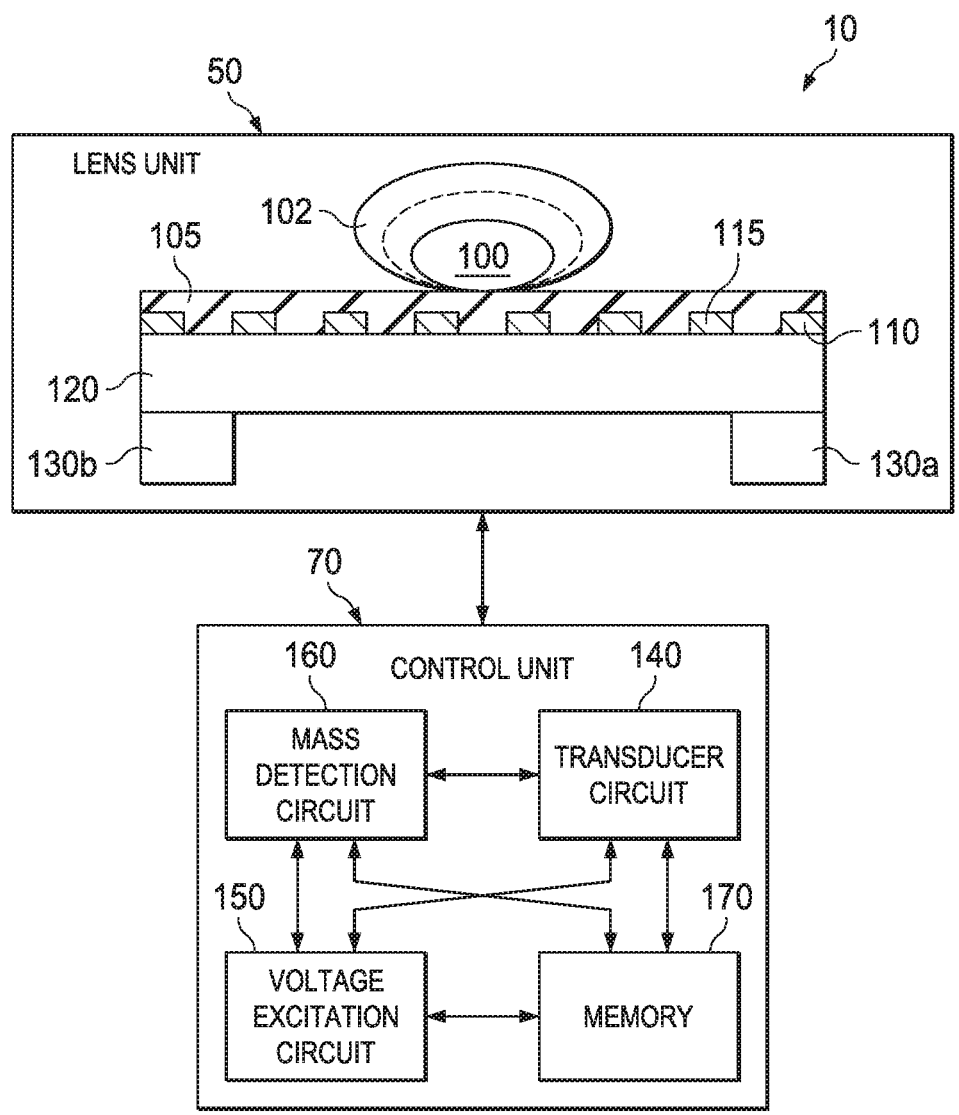
FIG. 2 shows a detailed illustrative block diagram of the system shown in FIG. 1 in accordance with various examples.

FIG. 2 shows a detailed illustrative block diagram of the system 10 shown in FIG. 1. As described above, the system 10 includes a lens unit 50 and a control unit 70. The lens unit 50 can include an optical lens 120 covered with a plurality of electrodes 110, 115. In some embodiments, the plurality of electrodes (e.g., 110, 115) can be further coated with a dielectric substrate 105. The dielectric substrate 105 can be any non-conductor, such as Teflon, polyimide, glass, etc. The optical lens 120 can be mechanically coupled with transducers 130a, 130b. For example, the transducers 130a, 130b can be piezoelectric transducers which each includes a piezoelectric material (e.g., lead zirconate titanate PZT or niobium doped lead zirconate titanate PNZT.). A droplet 102 can be disposed on a surface of the dielectric substrate 105 and can be coupled with the transducers 130a, 130b through the optical lens 120.

The example of FIG. 2 shows the control unit 70 further including a transducer circuit 140, a voltage excitation circuit 150, a mass detection circuit 160, and a memory 170. The transducer circuit 140, the voltage excitation circuit 160, the mass detection circuit 160, and the memory 170, in an embodiment, is configured to communicate with each other. The transducer circuit 140 can be coupled to the transducers 130a, 130b. The mass detection circuit 160 couples to the lens unit 50 and is configured to detect a mass of an entity present on the surface of the dielectric substrate 105 coupled with the transducers 130a, 130b through the optical lens 120. In some embodiments, the transducer circuit 140 can be present with the mass detection circuit 160 to detect and calculate the mass of the entity present on the surface of the dielectric substrate 105 coupled to the transducers 130a, 130b through the optical lens 120. For example, the transducer circuit 140 monitors a resonant frequency of the lens unit 50 constantly. A presence of the droplet 102 changes the resonant frequency of the lens unit 50. The change in the resonant frequency corresponds to the mass of the droplet present on the optical lens. The mass detected by the mass detection circuit 160 can be stored in the memory 170 present in the control unit 70.

In some embodiments, the mass detection circuit 160 detects the mass of a droplet on the surface of the dielectric substrate 105 coupled with the transducers 130a, 130b through the optical lens 120 by monitoring air capacitance between the electrodes 110, 115 present on the optical lens 120. For example, the air capacitance between the electrodes 110 and 115 is dependent on the air dielectric value. In a case when a droplet is present between the electrodes 110, 115, the value of the air dielectric can change, which results in a change in the air capacitance value. The bigger the size of the droplet, the therefore, the higher the capacitance between the electrodes 110, 115 and the bigger the mass of the droplet. The mass detected by the mass detection circuit 160 can be stored in memory 170 present in the control unit 70.

In an example embodiment, the transducer circuit 140 is further configured to vibrate the optical lens 120 at a resonant frequency. The vibration produced at the resonant frequency generates a region of high acceleration, i.e., a high displacement region and region of low acceleration, i.e., a low displacement region. The high displacement region provide high levels of axial acceleration, i.e., the acceleration provided at the high nodal region is sufficient enough to overcome the force of adhesion (Van Der Waals force, electrostatic force, surface energy, etc.) between the droplet 102 and the surface of the dielectric substrate 105. In an example embodiment, when the droplet 102 is located at the high displacement region, and when the optical lens 120 is vibrated at the resonant frequency, the droplet atomizes from the droplet size of 102 to a droplet size of 100 (i.e., the droplet reduces in volume). In some embodiments, the transducer circuit 140 stores a location of the high displacement region in the memory 170.

In some embodiments, the low displacement region provides low levels of axial acceleration, i.e., the acceleration provided at the low displacement region is not sufficient enough to overcome the force of adhesion (Van Der Waals force, electrostatic force, surface energy, etc.) between the droplet 102 and the surface of the dielectric substrate 105. In an example embodiment, when the droplet 102 is located at the low displacement region, and when the optical lens 120 is vibrated at the resonance frequency, the droplet does not atomize and the size of the droplet 102 remains the same. In some embodiments, the transducer circuit 140 stores a location of the low displacement region in the memory 170.

In some embodiments, the control unit 70 further includes a voltage excitation circuit 150 coupled to the plurality of electrodes. For example, the voltage excitation circuit 150 is connected to the plurality of electrodes 110, 115. When a droplet is detected by the mass detection unit 160, the voltage excitation circuit 150 is configured to apply a voltage sequence on the plurality of electrodes in order to move the droplet from one location on the optical lens to another location. For example, a droplet can be present at the low displacement region. As discussed above, the droplet does not atomize at the low displacement region. Thus, the droplet is not removed from the optical lens 120 by just vibrating the optical lens at a resonant frequency. As a solution, and to perform improved cleaning of the surface of the dielectric substrate 105, the voltage excitation circuit 150 can apply a voltage sequence on the electrodes to electrostatically move the droplet to the location of high displacement region.

In some embodiments, the first location of the droplet 102 is stored in memory 170. For example, as discussed above, the mass detection circuit 160 detects the mass of the droplet on the surface of the dielectric substrate 105 by monitoring air capacitance between the electrodes 110, 115 present on the optical lens 120. In some embodiments, the mass detection circuit 160 is further configured to detect the first location of the droplet 102 on the dielectric substrate 105 surface. In other embodiments, the voltage excitation circuit 150 is further configured to detect the location of the droplet 102 on the dielectric substrate 105 surface and further stores the first position in the memory 170.

As discussed above, the location of the high displacement regions and low displacement regions is stored in the memory 170. In an embodiment, when the first location of the droplet 102 is the same as location of the low displacement region, the voltage excitation circuit 150 applies a voltage sequence to move the droplet from the first location to the location of the high displacement region.

Figure 3:
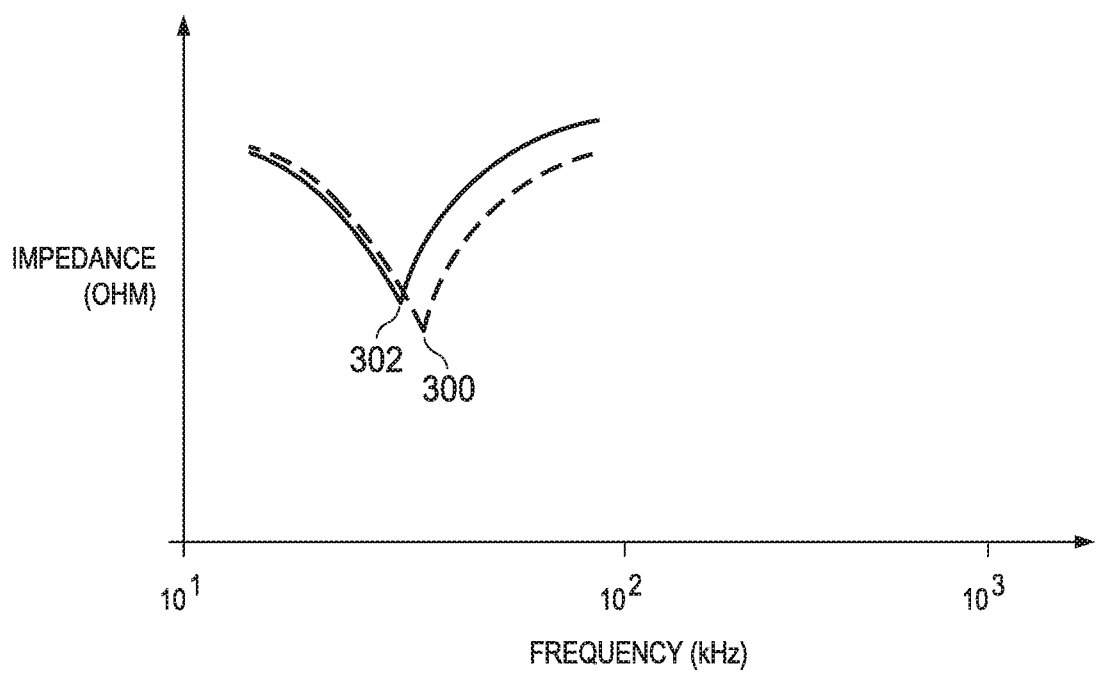
FIG. 3 shows an illustrative diagram of impedance versus frequency for an illustrative transducer mechanically coupled with an illustrative optical surface in accordance with various examples.

FIG. 3 shows an illustrative diagram of impedance versus frequency for an example transducer mechanically coupled with an example optical surface according to an embodiment. In an example embodiment, the resonant frequency 300 is at 25 kHz. As described above in FIG. 2, the resonant frequency is constantly monitored by the transducer circuit 140. For example, the resonant frequency of 25 kHz is depicted in FIG. 3 as 300. However, the resonant frequency can change to some lower value in response to a droplet present on an optical lens surface. For example, the graph of impedance and frequency shifts downwards to a lower frequency 302 when a droplet is present on the surface of the lens. The bigger the frequency change, the greater the mass of the droplet.

Figure 4:
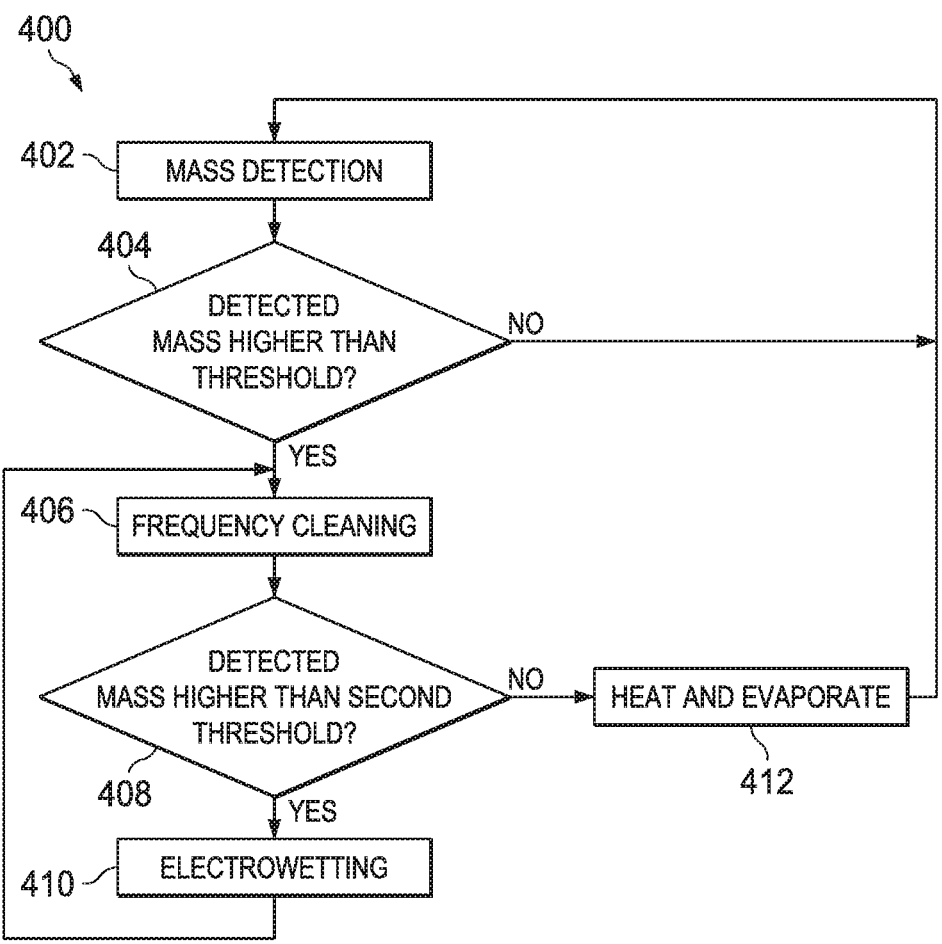
FIG. 4 shows an illustrative flowchart of a method for removing a droplet from a surface of a dielectric substrate in accordance with various examples.

FIG. 4 shows an illustrative flowchart of a method 400 for removing a droplet from the surface of a dielectric substrate using transducers mechanically coupled with an optical lens according to various examples. Though depicted sequentially as a matter of convenience, at least some of the actions shown can be performed in a different order and/or performed in parallel. Additionally, some embodiments perform only some of the actions shown. In some embodiments, at least some of the operations of the method 400, as well as other operations described herein, can be performed by the lens unit 50 (including the electrodes 110, 115, the transducers 130a, b, and the lens 120) and the control unit 70 (including the transducer circuit 140, the voltage excitation circuit 150, the mass detection circuit 160, and memory 170) and implemented in logic and/or by a processor executing instructions stored in a non-transitory computer readable storage medium.

The method 400 begins at block 402 with detecting a mass of a droplet, such as droplet 102. In some embodiments, the transducer circuit 140 and the mass detection circuit 160 are configured alone, or together, to detect the mass of the droplet 102. As described above, the transducer circuit 140 monitors a resonant frequency of the lens unit 50. The presence of a droplet changes the resonant frequency that is being monitored by the transducer circuit 140. In one example embodiment, the change in the resonant frequency corresponds to the mass of the droplet present on the optical lens. The mass detected by the transducer circuit 140 can be stored in the memory 170.

At block 404, the stored mass can be compared with a first mass threshold value to check if the mass of the droplet 102 is large enough to atomize. If the mass is not greater than the mass threshold value in block 404, the method 400 continues in block 402 with detecting the mass of another droplet. However, if the mass is greater than this mass threshold value in block 404, the method 400 proceeds to block 406 where a frequency cleaning cycle is run by exciting a vibration at a frequency to atomize the droplet. For example, a first vibration of a first frequency can be applied to the optical lens 120 to atomize the droplet size of 102 to a droplet size of 100, where the size of the droplet 102 is greater than the size of the droplet 100. In some embodiments, the size of the droplet can refer to the volume of the droplet.

The method 400 continues in block 408 with detecting the mass of the atomized droplet 100. In some embodiments, the mass detection circuit 160 detects the mass of the atomized droplet 100. If, in block 408, the mass of the atomized droplet 100 is greater than a second threshold value, the method 400 proceeds to the electro-wetting block 410 where the voltage excitation circuit 150 applies a voltage sequence to the plurality of electrodes to move the atomized droplet 100 to a high displacement region.

In some embodiments, along with detecting the mass, a location of the atomized droplet 100 can be detected by the mass detection circuit 160. For example, the mass detection circuit 160 is further configured to detect a first location of the droplet 100 on the dielectric substrate 105 surface. In an embodiment, the droplet 100 is located at the low displacement region. For such a case, the mass detection circuit 160 communicates the location of the droplet 100 to the voltage excitation circuit 150 where the voltage excitation circuit 150 applies a voltage sequence based on the position of the droplet 100, to move the droplet 100 from the low displacement region to the high displacement region.

The method 400 continues in block 406 with exciting a second frequency based on the detected mass of the atomized droplet 100. The second frequency further reduces the size of the droplet to a third droplet that is smaller than the droplet 100. The method 400 further continues, similar to the method above, at the block 408.

If, in block 408, the size of the droplet 100 is smaller than the second threshold value, the method 400 continues in block 412 to heat the droplet 100 to evaporate the droplet 100 from surface of the dielectric substrate. In some embodiments, the voltage excitation circuit 150 provides the heat, by generating a voltage, to the surface of the lens 120 to evaporate the droplet 100. After the droplet has been evaporated, the method 400 returns to the mass detection block 402.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
a mass detection circuit coupled to a surface of a lens covered with a plurality of electrodes, the mass detection circuit configured to detect a first droplet present on the surface and calculate a mass of the droplet;
a transducer circuit coupled to a transducer coupled to the surface, the transducer circuit configured to excite a first vibration of the surface at a resonant frequency to form a high displacement region on the surface, wherein the transducer and the surface form a lens unit;
a voltage excitation circuit coupled to the plurality of electrodes and configured to detect the location of the first droplet, wherein in response to the calculation of the mass and location of the first droplet, the voltage excitation circuit is configured to apply a sequence of differential voltages on one or more consecutive electrodes to move the first droplet to the high displacement region; and
a memory coupled to the transducer circuit, the mass detection circuit, and the voltage excitation circuit.

2. The apparatus of claim 1, wherein the transducer circuit is further configured to monitor a change in the resonant frequency of the lens unit, wherein the change in the resonant frequency corresponds to the change in mass of the droplet.

3. The apparatus of claim 1, wherein the mass detection circuit is further configured to calculate the mass of the first droplet by detecting a change in capacitance between a consecutive pair of electrodes.

4. The apparatus of claim 1, wherein in response to moving the first droplet to the high displacement region, the transducer circuit is further configured to excite a second vibration at a second frequency to atomize the first droplet and generate a second droplet, the second droplet having a size with a smaller volume than a size of the first droplet.

5. The apparatus of claim 4, wherein the transducer circuit is further configured to monitor a change in the resonant frequency of the surface, wherein the change in the resonant frequency corresponds to a change in mass of the second droplet, and in response to a determination that the mass of the second droplet size exceeds a threshold value, the voltage excitation circuit is further configured to apply a second sequence of differential voltages to move the second droplet to the high displacement region.

6. The apparatus of claim 4, wherein the mass detection circuit is further configured to calculate the mass of the second droplet size, and wherein in response to a determination that the second droplet size is lower than a threshold value, the voltage excitation circuit is further configured to heat the surface to evaporate the second droplet.

7. The apparatus of claim 1 wherein the mass detection circuit is further configured to detect a first position of the first droplet on the surface by detecting a change in capacitance between a pair of electrodes located on the first position of the droplet.

8. The apparatus of claim 1, wherein the high displacement region is at a center of the surface.

9. The apparatus of claim 1, wherein the location of the high displacement region is stored in the memory.

10. An apparatus, comprising:
a mass detection circuit coupled to a surface covered with a plurality of electrodes, the mass detection circuit configured to detect a first droplet present on the surface, calculate a mass of the first droplet, and compare the mass of the first droplet with a first mass threshold value;
a transducer circuit coupled to the surface, the transducer circuit including a transducer configured to excite a first vibration of the surface at a resonant frequency to form a high displacement region on the surface, wherein the transducer and surface form a lens unit, wherein in response to a determination that the mass is greater than the first mass threshold value, the transducer circuit is further configured to excite a vibration at a first frequency of the surface to atomize the first droplet to generate a second droplet, the second droplet having a size with a smaller volume than a size of the first droplet;
a voltage excitation circuit coupled to the plurality of electrodes and configured to detect the location of the second droplet, wherein in response to the detection of a mass and location of the second droplet, the voltage excitation circuit is configured to apply a sequence of differential voltages on one or more consecutive electrodes to move the second droplet to the high displacement region, wherein in response to moving the second droplet, the transducer is further configured to excite a second vibration at a second frequency to atomize the second droplet to generate a third droplet, the third droplet having a size with a smaller volume than the size of the second droplet; and a memory coupled to the transducer circuit, the mass detection circuit, and the voltage excitation circuit.

11. The apparatus of claim 10, wherein the transducer circuit is further configured to monitor a change in a resonant frequency of the lens unit, wherein the change in the resonant frequency corresponds to change in the mass of the droplet.

12. The apparatus of claim 10, wherein the mass detection circuit is further configured to calculate the mass of the first droplet by detecting a change in capacitance between a consecutive pair of electrodes.

13. The apparatus of claim 10, wherein the mass detection circuit is further configured to calculate a mass of the third droplet size, and wherein in response to a determination that the mass of the third droplet is less than a second threshold value, the voltage excitation circuit is further configured to heat the surface to evaporate the third droplet.

14. The apparatus of claim 10, wherein the mass detection circuit is further configured to:
   detect a first position of the first droplet on the surface;
   detect a second position of the second droplet on the surface; and
   detect a third position of the third droplet on the surface by detecting a change in capacitance between a pair of electrodes located at the first position, the second position, and the third position.

15. The apparatus of claim 10, wherein the high displacement region is at a center of the surface.

16. The apparatus of claim 10, wherein the location of the high displacement region is stored in the memory.

17. The apparatus of claim 10, wherein the location of a low displacement region on the surface is stored in the memory.

18. An apparatus, comprising:
   a transducer circuit coupled to a transducer, wherein the transducer circuit is further coupled to a surface covered with a plurality of electrodes, wherein the transducer and the surface form a lens unit, wherein the transducer circuit is configured to monitor a resonant frequency of the lens unit;
   a mass detection circuit coupled to the transducer circuit, the mass detection circuit configured to detect and calculate a mass of a first droplet in response to the resonant frequency of the lens unit changing from a first frequency to a second frequency;
   a voltage excitation circuit coupled to the plurality of electrodes and the mass detection circuit, wherein in response to a determination that the mass of the first droplet exceeds a threshold value, the voltage excitation circuit is configured to apply a sequence of differential voltages on one or more consecutive electrodes to move the first droplet from a first location to a second location; and
   a memory coupled to the transducer circuit, the mass detection circuit, and the voltage excitation circuit, wherein the location of the first droplet is stored in the memory.

19. The apparatus of claim 18 wherein the voltage excitation circuit is further configured to detect the first location of the first droplet by detecting a change in capacitance between a consecutive pair of electrodes.

20. The apparatus of claim 18, wherein the transducer circuit is further configured to form a high displacement region, the high displacement region corresponding to the second location.

21. The apparatus of claim 20, wherein the high displacement region is at a center of the surface.

22. The apparatus of claim 18, wherein the transducer circuit is further configured to excite a vibration at a resonant frequency to atomize the first droplet to generate a second droplet, the second droplet having a size with a smaller volume than a size of the first droplet.

23. The apparatus of claim 22, wherein the mass detection circuit is further configured to detect the mass of the second droplet size, and wherein in response to a determination that the second droplet size is lower than a second threshold value, the voltage excitation circuit is further configured to heat the surface to evaporate the second droplet.

24. The apparatus of claim 18, wherein the location of a low displacement region on the surface is stored in the memory.

* * * * *